E. McLAUGHLIN.
MILKING DEVICE.
APPLICATION FILED JUNE 26, 1911.
1,012,210.
Patented Dec. 19, 1911.
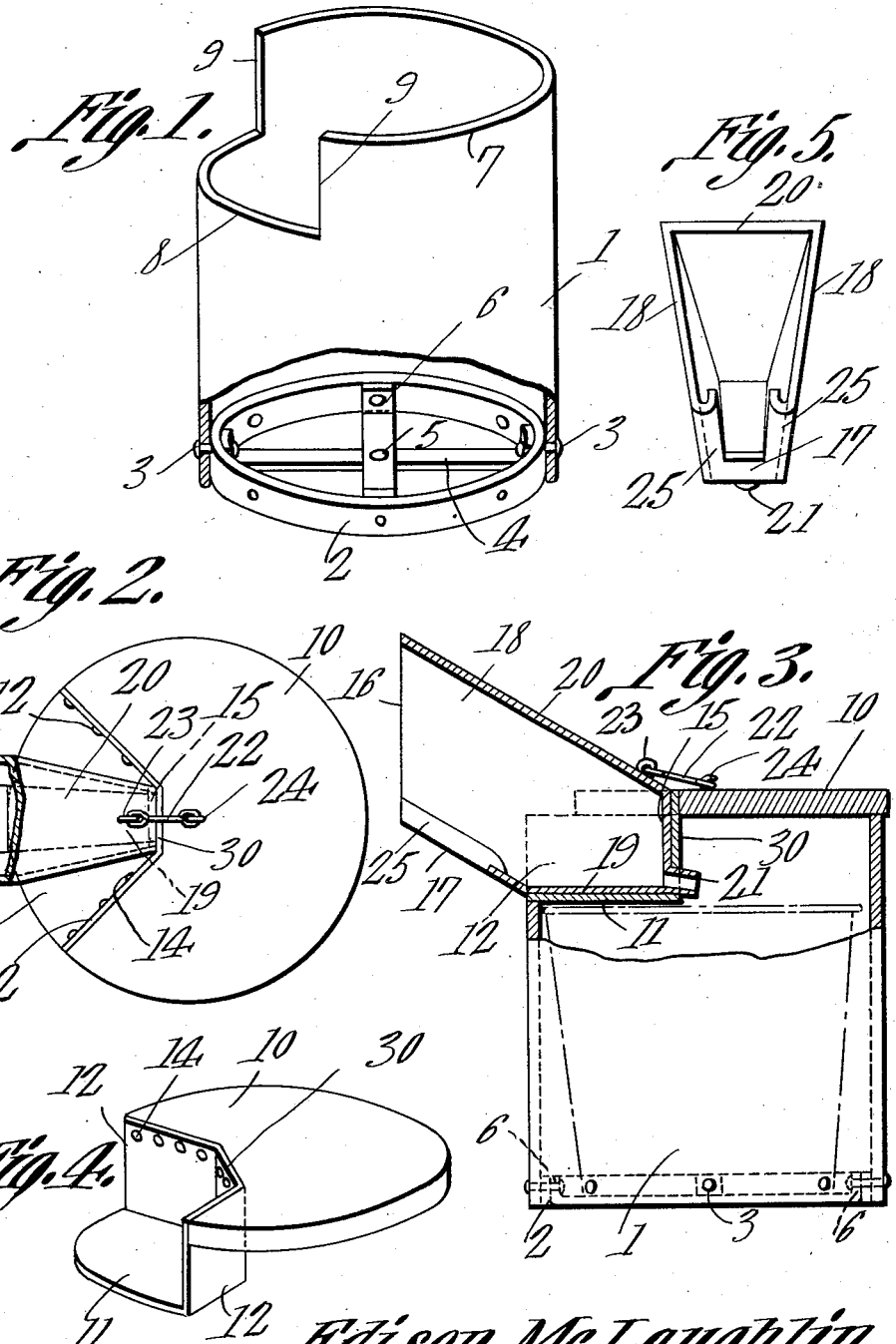

UNITED STATES PATENT OFFICE.

EDISON McLAUGHLIN, OF NAPERVILLE, ILLINOIS.

MILKING DEVICE.

1,012,210.      Specification of Letters Patent.      Patented Dec. 19, 1911.

Application filed June 26, 1911. Serial No. 635,355.

*To all whom it may concern:*

Be it known that I, EDISON MCLAUGHLIN, a citizen of the United States, residing at Naperville, in the county of Dupage and State of Illinois, have invented a new and useful Milking Device, of which the following is a specification.

The device forming the subject matter of this application, is a receptacle, adapted to receive a milk pail, a cover for the receptacle being provided, and a discharge member being removably secured to the cover, to receive the milk from the udder of the cow, the discharge member serving to conduct the milk through the cover into the pail which is housed beneath the cover, and within the receptacle.

The objects of the invention are to provide a receptacle of novel and improved form, to provide a discharge member of novel construction, to provide a cover for the receptacle, adapted to receive the discharge member, and to provide means for assembling the discharge member, removably, with the cover.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 is a sectional perspective of the receptacle; Fig. 2 is a sectional top plan of the completed structure; Fig. 3 is a sectional side elevation of the completed structure; Fig. 4 is a perspective of the cover; and Fig. 5 is an end elevation of the discharge member.

The receptacle 1 is a tubular structure, open at the top and at the bottom. Located within the receptacle 1, adjacent the lower end thereof, is a reinforcing band 2, secured to the receptacle 1 by means of rivets 3 or the like. The open bottom of the receptacle 1 is traversed by intersecting braces 4, riveted together, or otherwise secured, at their point of crossing, as denoted by the numeral 5. The ends of the braces 4 are upturned to form angularly disposed feet 6, the feet 6 abutting against the ring 2, and certain of the rivets 3 being employed for connecting the feet 6 with the ring 2 and with the receptacle 1. It is upon the intersecting braces 4 that the milk pail rests, during the milking operation. The upper edge of the receptacle 1 consists of two vertically spaced portions 7 and 8, united by vertical edges 9.

The cover for the receptacle 1 consists of vertically spaced parts 10 and 11, united by angularly disposed walls 12, converging toward the center of the cover, and united by an upright intermediate portion 30. In practice, the walls 12, the portion 30, and the part 11 may be fashioned in one piece, from metal, the part 10 being ordinarily fashioned from wood, the upper edges of the walls 12 and of the part 30, being secured to the part 10 by means of nails 14 or the like. When the cover, constructed as above described, is placed upon the receptacle 1, the part 10 of the cover will rest upon the upper edge 7 of the receptacle, the part 11 of the cover will rest upon the edge 8 of the receptacle, and the walls 12 of the cover will overlap the vertical edges 9 of the receptacle, the cover thus effecting a complete closure of the upper end of the receptacle 1.

The invention further includes a discharge member. This discharge member comprises an inner wall 15 and sides 18, a bottom 19 having an upwardly slanting portion 17 terminated short of the outer ends of the sides 18, and a top 20. The outer end of the discharge member is open, as indicated at 16. Outstanding from the inner wall 15, is a spout 21, passing through a suitable opening in the intermediate portion 30 of the cover.

A device is provided for securing the discharge member to the cover, this device preferably, although not necessarily, consisting of a link 22, pivoted to an ear 23, upon the top 20 of the discharge member, the link 22 being adapted to engage with a hook or like projection 24, mounted in the part 10 of the cover and denoted by the numeral 24. The lower edges of the sides 18 are flexed inwardly to form downwardly slanting troughs 25 discharging on the bottom portion 17 and having functions to be referred to hereinafter.

In practical operation, the milk pail is placed within the receptacle 1, to rest upon the braces 4, and the cover is placed upon the receptacle, effecting a closure thereof. The discharge member is then mounted in place upon the cover, the spout 21 passing through the intermediate portion 30, and the link 22 engaging with the projection 24. The milk, entering the opening 16, will flow along the bottom 17—19, through the spout 21, and thence into the pail. Any milk which may be projected against the sides 18, beyond the portion 17 of the bottom will be received by the troughs 25, and by means of these elements, be carried downwardly, upon the bottom 19, and into the vicinity of the spout 21. The intermediate portion 30 of the cover, serves as an abutment for the inner wall 15 of the discharge member, the link 22 permitting the discharge member to be swung about, into proper positions with respect to the udder of the cow. At this point it may be stated that the device is intended not only to serve as a housing for the milk pail, but, as well, to serve as a seat for the operator, the portion 10 of the cover constituting the seat-proper. Noting particularly Fig. 3, it will be seen that the portion 17 of the bottom is inwardly spaced from the outer end of the top 20, the top 20 preventing hair and other filth from dropping from the cow, to lodge within the device, and to contaminate the milk.

Having thus described the invention, what is claimed is:—

1. A combined milk stool and milk pail protector, comprising a receptacle; a lid for the receptacle; and a tubular discharge member opening through the lid and removably assembled with the lid, the discharge member having its top completely closed and its outer end open and having its bottom terminated short of its outer end.

2. A device of the class described comprising a receptacle; a lid therefor; a discharge member opening through the lid at one end and pivotally secured to the lid adjacent said end to swing bodily at its other end upon and parallel to the lid.

3. A device of the class described comprising a receptacle; a lid therefor; a discharge member resting upon the lid and slidable thereon, parallel to the lid; and a locking device connecting the discharge member, removably and pivotally, with the lid.

4. A device of the class described comprising a receptacle, the upper edge of which consists of vertically spaced sections; a lid consisting of spaced parts adapted to rest upon said portions of the receptacle, and a wall connecting the parts of the lid; a discharge member resting upon the lower portion of the lid; and a locking device connecting the discharge member removably, and pivotally, with the upper part of the lid, the discharge member opening through the lid.

5. A device of the class described comprising a receptacle, the upper edge of which consists of vertically spaced portions; a lid consisting of spaced parts adapted to rest upon said portions, and a wall connecting the parts of the lid; the discharge member resting upon the lower part of the lid; a locking device connecting the discharge member removably, and pivotally, with the upper part of the lid; the discharge member having a spout projecting inwardly, through the wall of the lid.

6. A device of the class described comprising a tubular discharge member including side walls and a bottom, the bottom being terminated short of the outer ends of the side walls; the side walls being provided with longitudinally extended, downwardly slanting troughs, adapted to discharge upon the bottom; means for establishing a communication between the discharge member and a receptacle.

In testimony that I claim the foregoing as my own, I have hereto affixed my signature in the presence of two witnesses.

EDISON McLAUGHLIN.

Witnesses:
 NICHOLAS SPODEN,
 HOWARD F. DETMER.

Copies of this patent may be obtained for five cents each, by addressing the "Commissioner of Patents, Washington, D. C."